May 24, 1960 N. K. PERKINS ET AL 2,937,455
TEACHING MACHINE
Filed Dec. 22, 1958 4 Sheets-Sheet 1
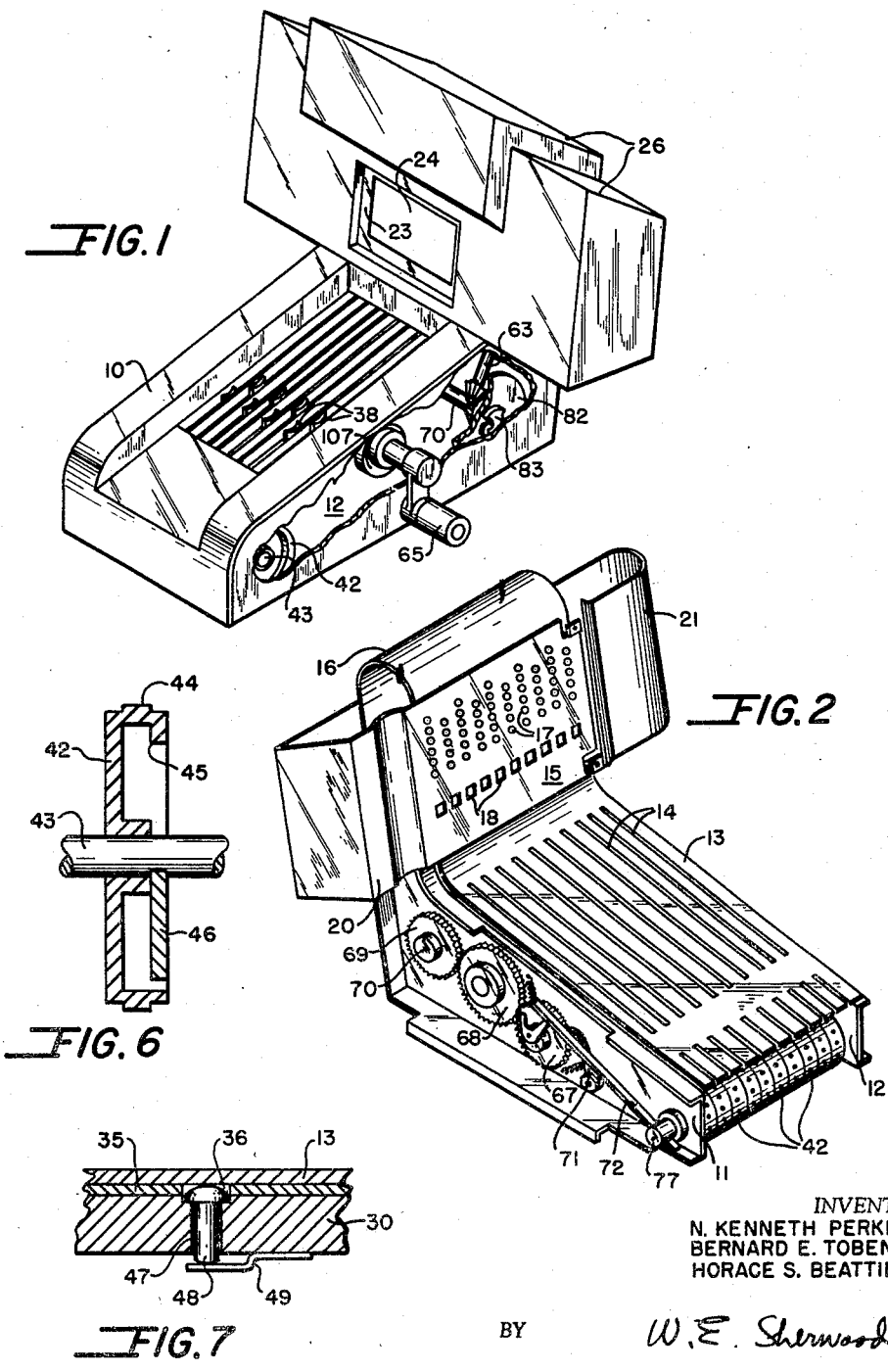
INVENTORS
N. KENNETH PERKINS
BERNARD E. TOBEN
HORACE S. BEATTIE
BY W. E. Sherwood
ATTORNEY

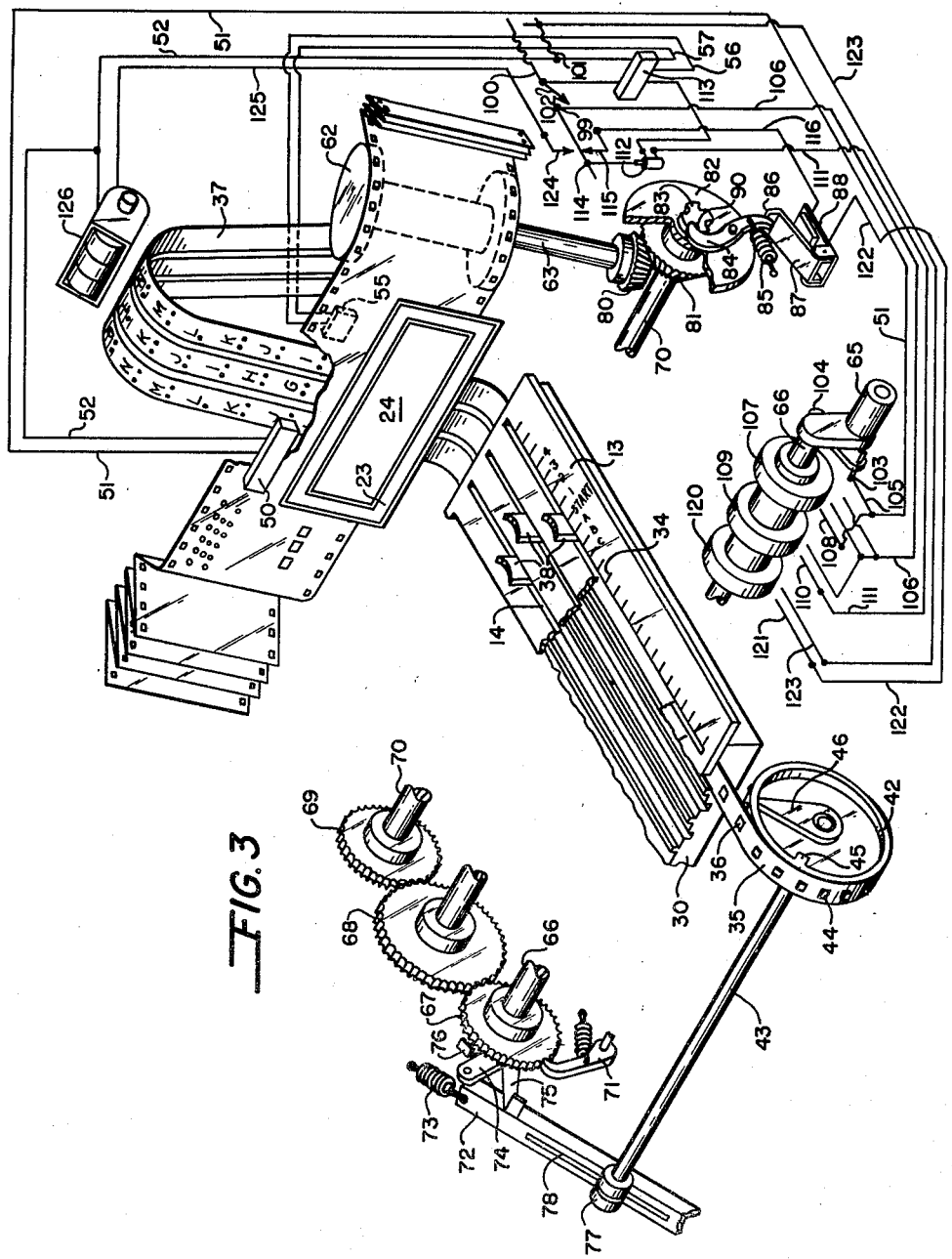

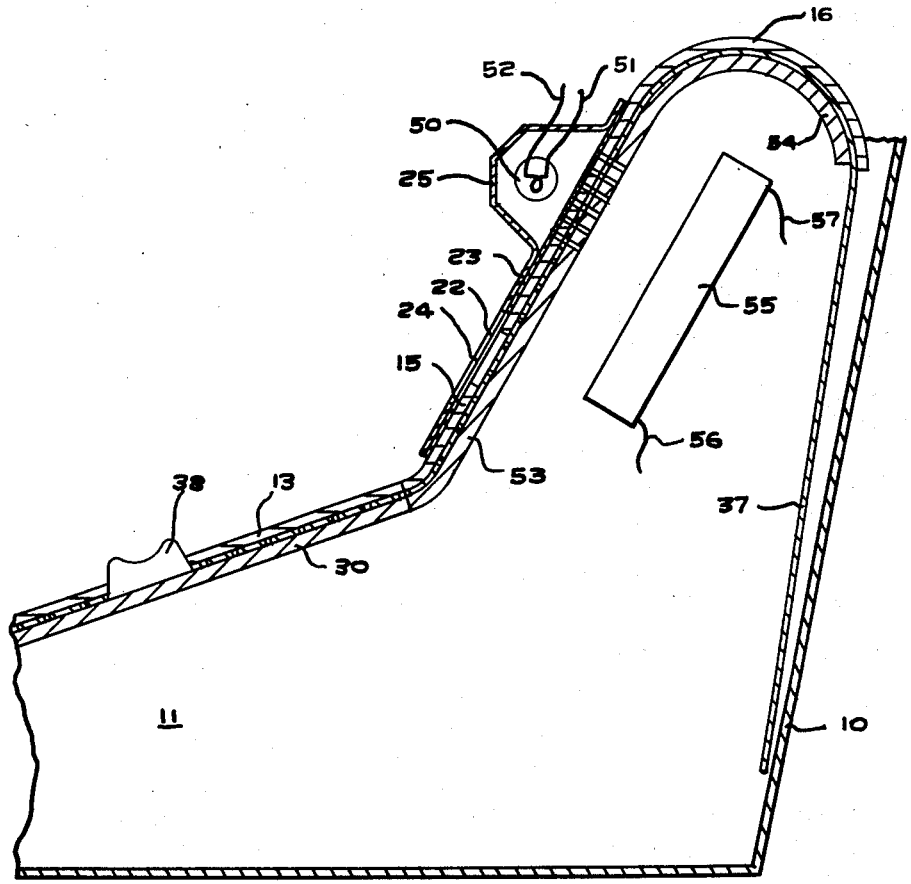

May 24, 1960

N. K. PERKINS ET AL 2,937,455

TEACHING MACHINE

Filed Dec. 22, 1958

| | 1 | 2 | 3 | 4 | 5 | 6 | A | B | C | D | E |
|---|---|---|---|---|---|---|---|---|---|---|---|
| 9 | | | x | | | | x | | | | |
| 8 | | x | | | | | | | | | x |
| 7 | x | | | | | | | | | x | |
| 6 | | | | | | x | | | x | | |
| 5 | | | | | x | | | x | | | |
| 4 | | | | x | | | x | | | | |
| 3 | | | x | | | | | | | | x |
| 2 | | x | | | | | | | | x | |
| 1 | x | | | | | | | | | x | |
| 0 | | | | | | x | | x | | | |
| START | | | | x | | | x | | | | |
| A | | | | x | | | | | | | x |
| B | | | x | | | | | | | x | |
| C | | x | | | | | | | x | | |
| D | x | | | | | | | x | | | |
| E | | | | | | x | x | | | | |
| F | | | | | x | | | | | | x |
| G | | | | x | | | | | | x | |
| H | | | x | | | | | | x | | |
| I | | x | | | | | | x | | | |
| J | x | | | | | | x | | | | |
| K | | | | | | x | | | | | x |
| L | | | | | x | | | | | x | |
| M | | | | x | | | | | x | | |
| N | | | x | | | | | x | | | |
| O | | x | | | | | x | | | | |
| P | x | | | | | x | | | | | |
| Q | | | | | x | x | | | | | |
| R | | | | x | x | | | | | | |
| S | | | x | x | | | | | | | |
| T | | x | x | | | | | | | | |
| U | x | x | | | | | | | | | |
| V | x | | | | | | | | | | x |
| W | | | | | | | | | | x | x |
| X | | | | | | | | | x | x | |
| Y | | | | | | | | x | x | | |
| Z | | | | | | | x | x | | | |

INVENTORS

N. KENNETH PERKINS
BERNARD E. TOBEN
HORACE S. BEATTIE

BY W. E. Sherwood

ATTORNEY

United States Patent Office 2,937,455
Patented May 24, 1960

2,937,455
TEACHING MACHINE

Norwood Kenneth Perkins, Bernard E. Toben, and Horace S. Beattie, Lexington, Ky., assignors to International Business Machines Corporation, New York, N.Y., a corporation of New York Filed Dec. 22, 1958, Ser. No. 782,201

8 Claims. (Cl. 35—9)

This invention relates generally to mechanical aids to teaching and more particularly to an improved apparatus especially well suited to the teaching of elementary subjects such as arithmetic, spelling and the like.

Various forms of such teaching aids have been proposed heretofore and in which various features recognized as desirable by educators, are incorporated.

For example, the teaching aid preferably should promptly report to the student whether his solution to a given problem, as visually presented to him by the machine, is right or wrong; should require him to obtain the correct solution prior to passing on to the next problem; should be capable of operation in a manner requiring no complex manipulation; and should produce no appreciable distracting influence when used in large numbers in a classroom.

Other requirements are that the machine should be as simple in construction as practicable; should be adaptable for use with readily substitutable problem material; should be free from malfunctioning; should register errors made by the student in solving the problems; and should be able to withstand comparatively careless handling.

In recognition of the foregoing requirements and in accordance with the present invention, there is provided a teaching machine having a novel combination of mechanisms, one of which includes an information storage medium preferably in the form of a tape and which medium carries a series of problems or the like, which are to be solved by the student. Moreover, the storage medium carries a series of corresponding responses or answers to those problems in the form of spaced, coded indicia, such as a series of apertures in that medium. For manipulation by the student, a plurality of movable answering elements are provided, these elements having appropriate indicia, as, for example, another series of apertures in spaced coded relation, to the end that registry or non-registry of these apertures with the apertures in the storage medium, will be indicative of an improper, or of a proper, answer to the problem in question.

An improved sensing means which is substantially free of inertia is employed to sense the registry or non-registry of the several apertures, and a controllable drive mechanism cooperating with the sensing means permits the storage medium to be advanced to the next problem when and only when a correct response was made by the student to the preceding problem. In addition, an improved mechanism is provided for resetting to starting position the movable elements used by the student and regardless of the correctness of the answer given to the previous problem. Furthermore, means associated with the sensing means serves to register an error when an incorrect solution to a problem is presented to that sensing means.

An object of the present invention is to provide an improved teaching machine having a substantially inertia-free sensing means for rapidly determining the accuracy or inaccuracy of the solution presented by the student.

Another object is to provide an improved apparatus serving as a mechanical aid to teaching and having an improved mechanism for resetting the apparatus following the sensing of a previous solution presented by the student.

A further object is to provide an improved simplified apparatus for teaching purposes, including the combination of a sensing means and a resetting means operable in sequence upon manipulation of a single element by the student.

Other objects of the invention will be pointed out in the following description and claims and illustrated in the accompanying drawings, which disclose, by way of examples, the principle of the invention and the best mode which has been contemplated, of applying that principle.

In the drawings:

Fig. 1 is a perspective view, with portions broken away, of one form of apparatus incorporating the invention.

Fig. 2 is a perspective view of the apparatus of Fig. 1 taken from a different position and with other portions broken away to show various features more clearly.

Fig. 3 is a schematic view of the several significant mechanisms contributing to the improved combination of the apparatus of Figs. 1 and 2.

Fig. 4 is a fragmentary plan view of the manually movable answering element operated by the student during the selection of an answer to a problem.

Fig. 5 is a view partly in section and transversely of the keyboard and work table.

Fig. 6 is a sectional view through a sprocket wheel for the resetting mechanism.

Fig. 7 is a detail view of a detent for indexing the movable tape element operated by the student.

Fig. 8 is a sectional view with portions broken away and showing the intersecting paths of travel of the tapes with relation to the sensing means.

Figures 9, 10:
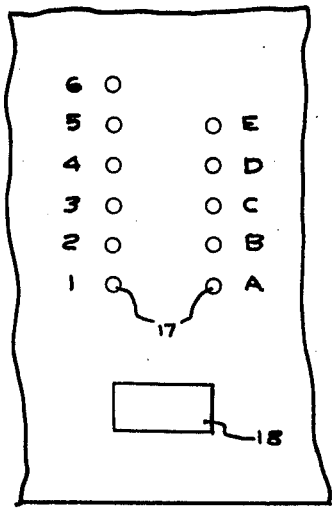
Fig. 9 is an enlarged view of a portion of the sensing plate and showing the apertures cooperating with a single answer tape.
Fig. 10 is a chart showing locations at which perforations are made in a problem tape to represent different characters.

Referring now to the drawings and more particularly to Figs. 1 and 2, a teaching machine of the general type disclosed in U.S. Patent 2,846,779 issued to B. F. Skinner, is shown. Housed within a suitable cover 10 is a framework having spaced side frame panels 11 and 12. Rigidly mounted between these frame panels is an inclined keyboard 13 having a plurality of parallel slots 14 therein. Suitably mounted upon the framework near the distal end of the keyboard is a sensing cover plate having a planar portion 15 and a curved back guide portion 16. The planar portion preferably is mounted at an angle more nearly approaching the vertical than the inclined keyboard, thus to provide an easily visible surface for the student facing that sensing plate. The planar portion 15 is formed with a series of horizontally spaced parallel rows of sensing apertures 17, the significance of which will later appear. It is to be noted that for any aperture to be found in the coded pattern of the problem tape, a corresponding aperture in one of the rows is provided.

In addition, the planar portion 15 contains a series of horizontally spaced apertures 18 each of which corresponds to a pair of rows of sensing apertures 17.

Laterally extending from the sensing plate is a left hand hopper 20 and a right hand hopper 21, for housing an information storage medium tape 22 adapted to be pulled from the left hand hopper for passage in a plane across the sensing plate portion 15 and to be contained in hopper 21. Suitably supported upon the planar portion 15 of the sensing plate in superposed relation to the movable tape 22 is a pressure plate 23 having a large aperture 24 therein. This pressure plate is shaped as shown in Fig. 8 to form a housing 25 in which a transmitter for the sensing medium later to be described, is housed. A removable front cover 26 serves to provide access to the hopper as when the information storage medium tape is to be replaced, and the cover may be provided with an aperture serving to frame the aperture 24 in the pressure plate and through which printed intelligence on the tape 22 is seen.

Considering now Figs. 4 and 5, a flat work table 30 having a series of relatively deep and narrow parallel grooves 31 in the upper face of the same, is mounted between the side panels of the machine frame and is provided with a series of relatively wide and shallow grooves 32 in its upper surface, these latter grooves being separated by ribs 33 extending to the upper surface of the table. The keyboard 13 fits closely against the top edges of these ribs with the slots 14 of the keyboard lying centrally above the grooves 31 of the work table. As best shown in Fig. 3, the keyboard contains on its face a plurality of markings 34, corresponding to letters, numerals, or the like, serving as components of the response which the student is to make to a problem being viewed through aperture 24. Mounted between the keyboard and the work table for reciprocable movement therealong is a plurality of movable answering elements for actuation by the student in the course of solving the problem presented by the tape 22.

Each of these movable elements may comprise a flexible member such as a flat metal tape having at one end an index tape portion 35 including uniformly spaced apertures 36 adapted for engagement with a sprocket wheel, and a forward tape portion 37 at the other end. The two tape portions may be joined to each other by means of bolts or the like extending through a tape button 38 suitably shaped for movement by the finger or thumb of the student. Thus, as seen in Fig. 5, the tape button moves along the slot 14 of the keyboard and carries with it the attached tape which slides in the shallow recess 32 of the work table, meanwhile being confined by the overlying keyboard.

As a significant feature of the forward portion of the tape, apertures 40 are formed therein and markings 41, such as numerals or letters, are placed upon that surface of the tape which is uppermost. Moreover, the path of movement of the forward portion of the tape coincides with the area containing one pair of rows of apertures 17 in the sensing plate 15 and with one of the apertures 18 in that plate. Accordingly, as the student pushes upon tape button 38 to extend the movable element, the forward portion of the assembled tape is guided under the sensing plate 15, engages the curved portion 16 of that plate, and is directed into the open space in the rear of the machine housing. By the same token, as the student pulls upon the button to shorten the tape, the forward portion likewise is guided under the sensing plate. It thus will be seen that the answering tape moves in a plane adjacent the plane in which the problem tape moves and is separated therefrom by the apertured sensing plate 15.

At its proximate end, the index tape portion 35 is affixed to a sprocket wheel 42 freely mounted for rotatable movement on an oscillatory shaft 43. As seen in Figs. 3 and 6, wheel 42 contains on its external periphery sprocket teeth 44 engageable in apertures 36 in the index tape and on one recessed face contains a narrow inwardly projecting abutment 45. Keyed to the shaft 43 is a striker arm 46 for engagement with either side of the abutment depending upon the direction of oscillation of the shaft and forming a portion of the improved resetting mechanism later to be described. For the purpose of indexing the tape to a selected setting of the button 38, the work table 30, as seen in Fig. 7, may include a detent arrangement having an aperture 47 housing a curved head plunger 48 acted upon by a flat spring 49 attached to the lower side of the table. The head of the plunger is in the path of movement of the apertures 36 of the index tape portion and when the button 38 is moved into correspondence with one of the markings 34 on the keyboard, the plunger then engages with the appropriate aperture 36 and prevents overrun of the sprocket wheel attached to the tape and insures that the apertures 40 and marking 41 of the answering tape are at the proper position with respect to sensing plate 15.

Reference now is made to Fig. 8 showing one arrangement for sensing the correctness or incorrectness of the answer selected by the student in connection with a given problem displayed by the teaching machine. In contrast with previous apparatus requiring physical contact between a sensing device and a movable tape or the like actuated by the student, this invention provides a sensing means which is devoid of such physical contact and which is substantially free of inertia considerations. Accordingly, an extremely rapid response is made by the sensing means, no frictional wear of the sensing device results, and a substantial simplification in actuation of moving parts is made possible. Since the apparatus provides for relative movement along intersecting paths of the apertured information storage medium and the apertured answering means carried by the movable elements actuated by the student, the respective apertures will be in registry under certain predetermined conditions. Accordingly a suitable sensing medium can be transmitted through those registered apertures from a transmitter located on one side of the above described tapes to a receiver located on the other side of the tapes and the desired controls on the operation of the apparatus can be exerted by that receiver. Various forms of such transmitters and receivers can be employed without departing from the invention. In the illustrated embodiment the transmitter is shown as a light source, the sensing medium is light, and the receiver is shown as a photoelectric cell. For example, a suitable light source 50 having conductors 51 and 52 extending thereto, is mounted within housing 25. This housing is shown as an integral portion of the pressure plate 23 which bears with an efficient light-sealing action against one surface of the movable problem tape 22. The problem tape in turn moves across the planar surface 15 of the sensing plate. Interiorly of the sensing plate is a sensing table having a planar section 53 and a curved section 54 corresponding to the configuration of the inner surfaces of the sensing plate and mounted in contact therewith. At its lower end the section 53 joins the distal end of work table 30 for support thereby and on its surface confronting the sensing plate the sensing table is formed with recesses forming a continuation of recesses 32 of the work table. Thus, as the tape portions 37 actuated by the student are pushed forwardly, those portions are guided with a close fit through the recesses of the sensing table and the distal ends of the tape portions hang downwardly within the back portion of cover 10. Within the recesses in the sensing table are a series of apertures corresponding to and placed in registry with the apertures 17 in the sensing plate 15.

Mounted within the interior space of cover 10 is a suitably disposed photoelectric cell 55 having conductors 56 and 57 leading to the terminals of a suitable control device, such as a thyratron unit. The cell serves as the receiver element for the sensing medium. Referring now to Fig. 3, the information storage medium tape 22 contains a series of apertures 60 arranged in a coded pattern in horizontally spaced parallel pairs of rows corresponding to the rows of apertures 17 in the sensing plate 15. A row of apertures 61 corresponding to the apertures 18 on the sensing plate also is provided, and between the apertures 60 and 61 a sufficient space is available for printed intelligence in the form of problems to be solved and for any ancillary explanatory material.

Mounted within the right hand hopper 21 is a sprocket wheel 62 driven by shaft 63 and serving to engage and to move the storage medium tape under certain conditions later to be described.

Considering now the resetting mechanism by means of which the apparatus is reset for work on subsequent problems, a handle or crank 65 on shaft 66 is mounted for turning one revolution at a time in a clockwise direction, as seen in Fig. 3, this shaft being supported in the side frame members. Upon so turning the handle, gear 67 turns one revolution and through idler 68 turns gear 69 and shaft 70. A ratchet 71 acts on the gear 67 to hold it against rotation in a counter-clockwise direction. An elongated walking-beam type of an oscillatory restoring link 72 is mounted adjacent the side frame 11 (Fig. 2) and at one end has a tension spring 73 serving to pull that link fully in one direction after restoration is completed. An arm 74 pivoted to one end of the link is rotatably mounted at its other end as a bushing on shaft 66. Rigidly mounted upon shaft 66 in surrounding relation to arm 74 is a bell crank having arms 75 and 76, the space between these arms serving as a lost motion device permitting the sensing means to function prior to resetting of the manually movable answering elements. Fastened at each end to link 72 and trained over a grooved restoring cylinder 77 with a taut encircling engagement therewith, is a flexible cable 78. If desired, there may be used, in place of the link and cylinder, a rack and pinion not shown. Cylinder 77 is rigidly affixed to the end of oscillatory shaft 43. Thus, as handle 65 is turned, the arm 75 of the bell crank engages arm 74 after a slightly delay and begins a rotation of that arm, the spring 73 meanwhile being slack. As arm 74 moves in its rotation, the link 72 is pulled with it in a rocking and translated path and through the cable 78, the cylinder 77 and shaft 43 are rotated in a counter-clockwise direction in Fig. 3. As shaft 43 so rotates, each of the striker arms 46 associated with each of the sprocket wheels 42 will engage with the abutment 45 of the respective wheel and rotate the wheel to the extent necessary to reset the tape 35 of that wheel to the position marked Start on keyboard 13 if the tape had previously been moved forwardly. After being so reset, the tape is held in reset position by detent 48 (Fig. 7). Continued rotation of shaft 66 and the attached bell crank will then cause the arm 75 to move the link 72 rearwardly against the action of the spring 73, thus reversing rotation of the shaft 43 and causing the striker arms 46 to engage the abutments 45 on wheels engaged by tapes that had been moved rearwardly from start positions. These wheels are turned by the arms to restore the tapes to start position, which condition is reached when the arm 74 has been rotated approximately 270 degrees. Further rotation of the shaft 66 causes the arm 74 to pass dead center so the spring 73, now under tension, moves the link 72 forwardly to the position shown in Fig. 3. The striker arms 46 are then in positions permitting movement of the tapes in either direction. After shaft 66 completes its one revolution and the apparatus is reset, spring 73 serves to hold arm 74 against the bell crank arm 76 and to prevent play in the respective parts. It will be understood that a plurality of wheels 42 corresponding to a plurality of answering tapes, will normally be mounted on shaft 43 and that the operation as described effects the resetting of all of these tapes simultaneously.

For the purpose of requiring the student to solve a given problem correctly before studying a subsequent problem, means to control the rotation of shaft 63 is provided. This may conveniently include a bevel gear 80 on shaft 63 engaging with a bevel gear 81 carried by a clutch plate 82. This clutch plate assembly is rotatably mounted on shaft 70, the end of that shaft being formed with a series of notches 83. Carried on the clutch plate is a pivotally mounted lever 84 having at one end a tooth 90 biased toward engagement with the notches in the shaft 70 by means of a spring 85. At its other end, the lever includes an arm 86 extending into engagement with a notched plate 87 of a latch operated by a conventional magnet 88. Thus, when the magnet is energized, the plate 87 is pulled from engagement with the arm 86 and the clutch plate 82 is then clutched to shaft 70 and rotates therewith, but when magnet 88 is not energized, shaft 70 can turn without turning gears 81 and 80.

Having thus described the sensing arrangement and the restoring arrangement for the apparatus, it will be appreciated that various ways may be employed to indicate whether an answer made to a problem presented by the tape 22 is correct or incorrect. It is preferred to assemble the apparatus so that the transmission of a medium such as light through registered apertures in both the problem tape and the answering tape will indicate an incorrect answer, although for simple forms of apparatus that transmission could be used to indicate a correct answer. As disclosed herein, the former arrangement is used and accordingly the following operation will ensue with a suitable source of electrical energy, for example 110 volt A.C. applied to conductors 100 and 101 and with switch 102 closed against terminal 99. After moving the several tape buttons 38 to the selected positions, the student, by viewing the markings 41 on the answering tape assemblies through apertures 18 and 61 in the sensing plate and problem tape respectively, decides that the answer is as he desires it to be. He then pushes inwardly the locking button 103 carried upon a bracket 104 mounted adjacent handle 65, whereupon handle 65 may be turned through one revolution. Button 103 preferably is biased to move back into handle engaging position after once being disengaged from the handle. The inward movement of button 103 closes switch 105 across conductors 51 and 106 thus forming a circuit through lamp 50. Since, however, this circuit must be maintained until sensing is completed, a cam 107 on shaft 66 also closes a switch 108 across conductors 106 and 51 as shaft 66 begins to turn, thus permitting locking button 103 to return to its initial position without interrupting the lamp circuit.

A second cam 109 on shaft 66 serves to close switch 110 across conductors 106 and 111, the latter conductor leading to relay 112 which in turn is connected to thyratron unit 113. This unit is actuated by an impulse supplied by conductors 56 and 57 leading from cell 55. The cell may conveniently be of the photo-resistor type wherein the sensing results in a high resistance output from the cell for a correct answer and a low resistance output for an incorrect answer. Relay 112 controls the switch arm 114 connected to terminal 99 and which arm normally rests against contact 115 connected to conductor 116 leading to magnet 88. Thus, when a correct answer is supplied by the student, no light is transmitted from transmitter lamp 50 to photocell receiver 55 and no impulse is received by the thyratron unit. In this situation, no circuit is made through relay 112 and switch arm 114 remains in contact with terminal 115. A circuit is accordingly made through magnet 88 when a third cam 120 on shaft 66 closes switch 121 across conductors 122 and 123. As this circuit is made, magnet 88 draws downwardly the latch 87, clutch plate 82 engages with shaft 70 which is being turned by the moving handle 65, and causes shaft 63 to advance the information storage medium tape to the next problem. Due to the rapidity with which this sensing may be accomplished, the sensing is completed before the arm 75 of the bell crank on shaft 66 operates the restoring link.

Conversely, in the event an incorrect answer has been prepared by the student, light will be transmitted through at least one aperture 40 in at least one of the tapes 37 which will be in registry with at least one of the apertures 60 in the problem tape 22. As described hereinabove, the apertures in both the sensing plate 15 and in the sensing table 53 are so positioned as to coincide with any aperture 60 which may appear in the problem tape being used. Thus the answering tapes 37 alone provide the means which interrupts all transmission of the sensing medium from the transmitter to the receiver. Upon transmission of light through registered apertures and to the photo-electric cell 55 the following operation ensues. The cell 55 then sends an impulse through conductors 56 and 57 energizing thyratron unit 113 which energizes relay 112. When so energized, relay 112 moves switch arm 114 into contact with terminal 124 and breaks contact with terminal 115. No circuit can then be made through magnet 88 and as shaft 70 turns, the clutch plate 82 is held by latch 87 and no advance of the problem tape occurs. When the subsequent resetting of the apparatus is accomplished, the student still will be confronted with the same problem to which he has devised an erroneous answer.

In addition, when relay 112 moves switch arm 114 into engagement with contact 124, a circuit is completed through conductor 125, a conventional electrically operated counter 26, and conductor 52, thus actuating the counter and registering an error for the student.

Following the completion of the described sensing operations, the handle 65 continues its rotation into the original position in engagement with button 103 and the switches 108, 110 and 121 are reopened as their respective cams break contact therewith. Moreover, switch arm 114 is restored to its normal position in contact with terminal 115 and the apparatus is again in readiness for the student to work upon the problem as now presented by the tape 22 and visible through the window 24.

With the foregoing description in mind, it now will be apparent that the apparatus is well suited to satisfy the several requirements which should be met by mechanical teaching aids for efficient instruction. The improved restoring means employed in the apparatus may be used in conjunction with different forms of sensing means, the latter not being limited necessarily to the use of light as a sensing agency. Various codes for use with the information storage medium may be employed, but for compact arrangement a two out of eleven code has been found satisfactory.

To operate on a two out of eleven code, there is provided, as mentioned above, two rows of apertures 17 in the sensing plate for each answer tape. As shown more clearly in Fig. 9, one of these rows has six apertures or holes which have been numbered 1 to 6 for purposes of description, and the other row has five apertures designated A, B, C, D, and E. Each alphabetic and numeric character in the problem tape is represented by two perforations so located that one of them may coincide with one of the numbered holes 17 while the other coincides with one of the lettered holes 17. For instance, the letter A in the problem tape is represented by perforations that would underlie holes 17 located in positions 4 and E. The number "1" in the problem tape is represented by perforations underlying holes 1 and C. The chart of Fig. 10 indicates by "X" the positions at which perforations would be formed in the problem tape to represent the different characters. It will be noted that some of the characters are represented by perforations which underlie holes in either two numbered positions or two lettered positions.

In the answer tape portion 37 the holes 40 are formed according to the complement of the perforations in the problem tape. When the answer tape is positioned so that a particular character appears at opening 18, the portion of the answer tape underlying the apertures 17 at that time contains holes in alignment with all of the apertures except those at which perforations would exist in the problem tape for the same character. It will be seen that a setting of the answer tape to a position corresponding to the character formed in the problem tape results in a blocking of all of the apertures 17.

While there has been shown and described and pointed out the fundamental novel features of the invention, as applied to a preferred embodiment, it will be understood that various omissions and substitutions and changes in the form and details of the device illustrated and on its operation may be made by those skilled in the art without departing from the spirit of the invention. It is the intention, therefore, to be limited only as indicated by the scope of the following claims.

What is claimed is:

1. A teaching machine comprising, in combination, a movable tape carrying a series of printed problems and a series of perforations representing the answers to said problems, a plate having apertures with which said perforations cooperate when said tape is in a position presenting a problem to be solved, a member movable manually to a position representative of the answer to the problem presented, said member having apertures cooperating with the apertures in said plate, means at one side of said plate for producing a medium capable of being sensed, a device at the opposite side of said plate responsive to said medium, said tape and said member controlling the flow of said medium through said apertures to said device, means including a controllable drive mechanism for moving said tape from a position presenting one problem to a position presenting the next problem, and means including said device operable to control said drive mechanism when said member is moved to a position representative of the problem presented.

2. Apparatus according to claim 1 wherein said means for producing said medium comprises a light source, said medium comprises light and said device responsive to said medium comprises a photo electric cell.

3. A teaching machine comprising in combination, a movable tape carrying a series of printed problems and a series of perforations representing the answers to said problems, a plate having apertures with which said perforations cooperate when said tape is in a position presenting a problem to be solved, a member movable manually to a position representative of the answer to the problem presented, said member having apertures cooperating with the apertures in said plate, means at one side of said plate for producing a medium capable of being sensed, a device at the opposite side of said plate responsive to said medium, said tape and said member controlling the flow of said medium through said apertures to said device, a controllable drive mechanism for moving said tape from a position presenting one problem to a position presenting the next problem and including a manually rotatable shaft and a clutch means, said clutch means being adapted to engage said shaft and to move said tape when a correct answer is presented by said member and to be disengaged from said shaft when an incorrect answer is presented by said member, and means including said device operable to engage said clutch with said shaft when said member presents a correct answer.

4. Apparatus according to claim 3 including a selectively movable locking means for preventing inadvertent movement of said shaft and being movable between locked and unlocked positions, said locking means being adapted to actuate said means for producing said sensing medium upon movement of said locking means into unlocked position.

5. A teaching machine comprising, in combination, a movable tape carrying a series of printed problems and a series of perforations representing the answers to said problems, a plate having apertures with which said perforations cooperate when said tape is in a position presenting a problem to be solved, a member manually movable from and toward a starting reference point and adapted to occupy a position representative of the answer to the problem presented, said member having apertures cooperating with the apertures in said plate, means at one side of said plate for producing a medium capable of being sensed, a device at the opposite side of said plate responsive to said medium, said tape and said member controlling the flow of said medium through said apertures to said device, means including a controllable drive mechanism for moving said tape from a position presenting one problem to a position presenting the next problem, means including said device operable to control said drive mechanism when said member is moved from said reference point to a position representative of the problem presented and means for restoring said member to said reference point following the sensing of the answer to the problem including a manually rotatable shaft, an oscillatory restoring shaft having a wheel rotatably mounted thereon and connected to said member, means on said restoring shaft for engagement with said wheel during a portion of the movement of said restoring shaft, an oscillatory means connected to said restoring shaft, and means affixed to said rotatable shaft for moving said oscillatory means through a predetermined oscillatory path during rotation of said rotatable shaft thereby to position said member at said reference point at the conclusion of movement of said oscillatory means.

6. Apparatus according to claim 5 including means for actuating said means for producing sensing medium at the initiation of movement of said rotatable shaft.

7. Apparatus according to claim 6 wherein said means affixed to said rotatable shaft includes a lost motion to permit the answer presented by said member to be sensed prior to initiation of movement of said oscillatory shaft.

8. Apparatus for teaching comprising an information storage medium carrying a series of units of printed intelligence and corresponding series of units of related intelligence in the form of physically distinctive indicia capable of being sensed, means to advance said storage medium to expose said first-named units to view consecutively, manually operable means to provide a response to each of the units of said first-named series including a plurality of movable members whose respective positions are representative of the components of said response, physically distinctive indicia carried by said movable members for non-register with said first-mentioned indicia when the positions of said members are collectively representative of the corresponding unit of said first-mentioned indicia and for register with said first-mentioned indicia when the positions of said members are collectively non-representative of said corresponding unit of said first-mentioned indicia and means mounted in physically spaced relation from each of said first-mentioned and second-mentioned indicia to sense the registry thereof, thereby to distinguish between conformity and non-conformity as found between the response and the unit of related intelligence.

References Cited in the file of this patent

UNITED STATES PATENTS

| | | |
|---|---|---|
| Re. 23,030 | Holt | Aug. 24, 1948 |
| 1,670,480 | Pressey | May 22, 1928 |
| 2,401,434 | Mills | June 4, 1946 |